United States Patent
Shiobara et al.

(10) Patent No.: US 9,777,107 B2
(45) Date of Patent: Oct. 3, 2017

(54) SILICONE-MODIFIED EPOXY RESIN AND COMPOSITION AND CURED ARTICLE THEREOF

(71) Applicants: Shin-Etsu Chemical Co., Ltd., Tokyo (JP); Nippon Kayaku Kabushiki Kaisha, Tokyo (JP)

(72) Inventors: Toshio Shiobara, Tokyo (JP); Junichi Sawada, Gunma (JP); Miyuki Wakao, Gunma (JP); Tsutomu Kashiwagi, Gunma (JP); Naofusa Miyagawa, Tokyo (JP); Yoshihiro Kawada, Tokyo (JP); Chie Sasaki, Tokyo (JP); Masataka Nakanishi, Tokyo (JP); Kenichi Kuboki, Tokyo (JP)

(73) Assignees: Shin-Etsu Chemical Co., Ltd., Tokyo (JP); Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/023,263

(22) PCT Filed: Sep. 19, 2014

(86) PCT No.: PCT/JP2014/074864
§ 371 (c)(1),
(2) Date: Mar. 18, 2016

(87) PCT Pub. No.: WO2015/041325
PCT Pub. Date: Mar. 26, 2015

(65) Prior Publication Data
US 2016/0237202 A1    Aug. 18, 2016

(30) Foreign Application Priority Data
Sep. 20, 2013   (JP) .................. 2013-196250

(51) Int. Cl.
C08G 59/30    (2006.01)
(52) U.S. Cl.
CPC .......... C08G 59/306 (2013.01); C08G 59/30 (2013.01)
(58) Field of Classification Search
CPC ...... C08G 59/306; C08G 77/12; C07C 13/43; C07C 13/40
See application file for complete search history.

(56) References Cited

U.S. PATENT DOCUMENTS

| | | | |
|---|---|---|---|
| 5,492,981 A | 2/1996 | Hoehn et al. | |
| 6,815,520 B2 | 11/2004 | Yoneda et al. | |
| 7,004,375 B2 * | 2/2006 | Shah .................. | C08L 71/00 228/215 |
| 2004/0122186 A1 * | 6/2004 | Herr ..................... | C08G 59/306 525/476 |
| 2005/0133073 A1 | 6/2005 | Krieg | |
| 2005/0261390 A1 | 11/2005 | Frances et al. | |

FOREIGN PATENT DOCUMENTS

| | | | |
|---|---|---|---|
| JP | 02 207087 | * | 8/1990 |
| JP | 2-207087 A | | 8/1990 |
| JP | 7-97433 A | | 4/1995 |
| JP | 2002-265787 A | | 9/2002 |
| JP | 2005-133073 A | | 5/2005 |
| JP | 2005-272492 A | | 10/2005 |
| JP | 2006-282988 A | | 10/2006 |
| JP | 2008-501644 | | 1/2008 |
| JP | 2008-45088 A | | 2/2008 |

OTHER PUBLICATIONS

JP 02 207087 Abstract (1990).*
JP 02 207087 partial translation (1990).*
English Translation of Written Opinion of the International Search Report for corresponding PCT application No. PCT/JP2014/074864 dated Oct. 28, 2014.
International Search Report for corresponding PCT application No. PCT/JP2014/074864 dated Oct. 28, 2014.
Chinese Office Action and English Translation for corresponding Chinese Patent Application No. 201480063205.2 dated Apr. 5, 2017.

* cited by examiner

*Primary Examiner* — Kuo-Liang Peng
(74) *Attorney, Agent, or Firm* — Wood, Phillips, Katz, Clark & Mortimer

(57) ABSTRACT

An epoxy resin represented by the following formula (1)

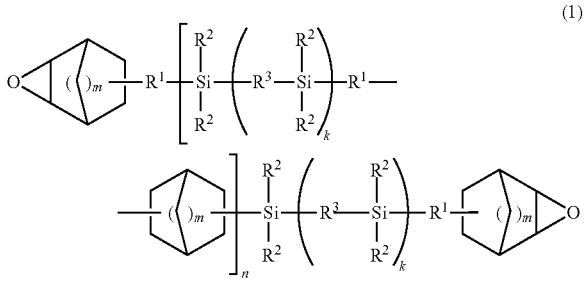

wherein $R^1$ represents an alkylene group having 2 to 6 carbon atoms and optionally containing an ester or ether bond; $R^2$ represents a monovalent aliphatic hydrocarbon group having 1 to 6 carbon atoms or a monovalent aromatic hydrocarbon group having 6 to 12 carbon atoms; $R^3$ represents an oxygen atom or a phenylene group; k represents 1 to 10 as an average value; m represents an integer of 0 to 2; n represents 0 to 10 as an average value; and a plurality of groups $R^1$, $R^2$, $R^3$, k, or m present in the formula may be the same or different from each other.

5 Claims, 2 Drawing Sheets

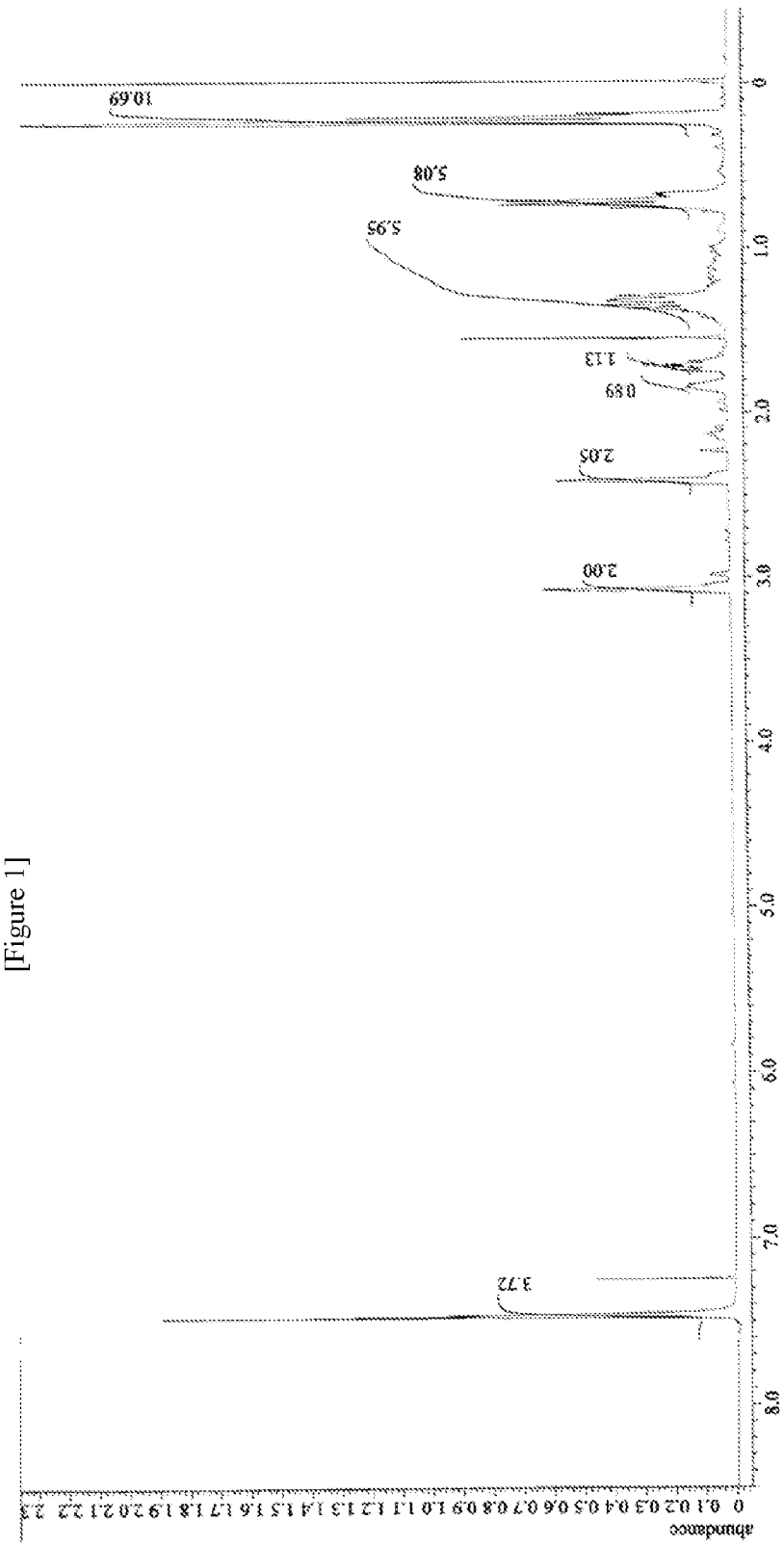
[Figure 1]

[Figure 2]
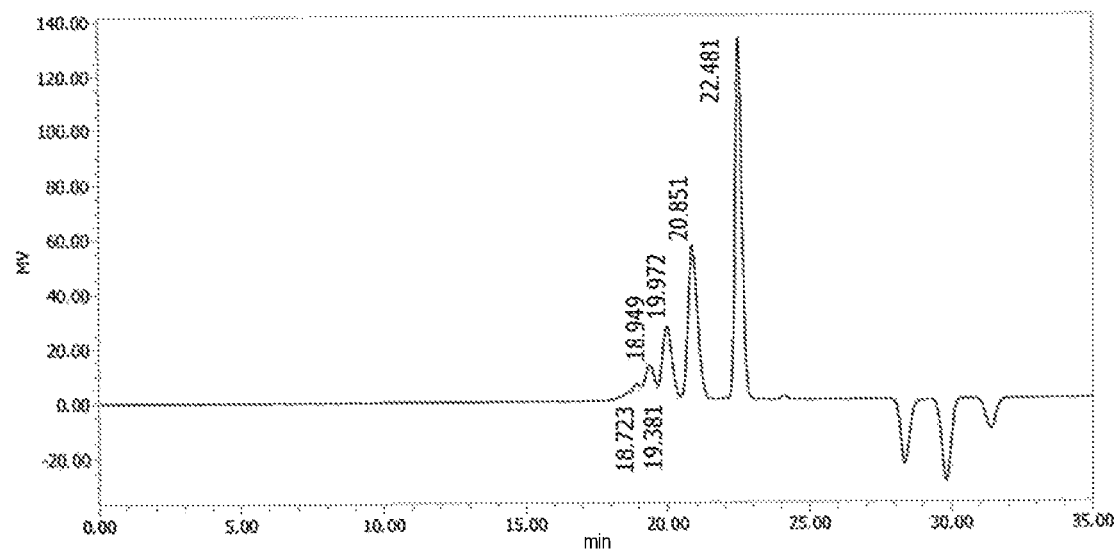

SILICONE-MODIFIED EPOXY RESIN AND COMPOSITION AND CURED ARTICLE THEREOF

BACKGROUND ART

Compositions containing a bisphenol A-type epoxy resin excellent in adhesiveness or mechanical strength, an epoxy resin free from UV absorption, for example, a hydrogenated bisphenol A-type epoxy resin or an alicyclic epoxy resin, a curing agent, and a curing catalyst are frequently used as resin compositions for optical semiconductor device sealing. Such compositions, however, disadvantageously cause change in color or cracks due to light, heat, or the like from LED devices, as the luminance and output of the LED devices are increased.

To solve these problems, a resin containing one or more epoxy groups introduced in a silicone resin that offers a UV absorption-free and flexible cured article is known. For example, a silicone resin having one or more cyclic ether-containing groups such as a glycidyl group and an epoxycyclohexyl group (Patent Literature 1), a reaction product of epoxyalkoxysilane and silanol (Patent Literature 2), and an alicyclic epoxy-modified silicone resin used in combination with an alicyclic epoxy resin (Patent Literature 3) are known. Silicone resins, however, have very high gas permeability as compared with epoxy resins. Therefore, products having a higher silicone content are more difficult to use in usage required to have low gas permeability. Accordingly, an addition reaction-type phenyl silicone resin composition is disclosed as a resin composition having low gas permeability (Patent Literature 4), but is still unsatisfactory in terms of low gas permeability and adhesiveness.

CITATION LIST

Patent Literature

Patent Literature 1: Japanese Patent Laid-Open No. 2008-45088
Patent Literature 2: Japanese Patent Laid-Open No. 7-97433
Patent Literature 3: Japanese Patent Laid-Open No. 2006-282988
Patent Literature 4: Japanese Patent Laid-Open No. 2002-265787

SUMMARY OF INVENTION

Technical Problem

The present invention has been made in light of the aforementioned circumstances, and an object of the present invention is to provide a silicone-modified epoxy resin composition that offers a cured article excellent in low gas permeability and strength, and an epoxy resin cured article obtained by curing the composition.

The present inventors have conducted diligent studies in light of the aforementioned situations and consequently completed the present invention.

Specifically, the present invention relates to the following (1) to (8):

(1) A silicone-modified epoxy resin represented by the following formula (1):

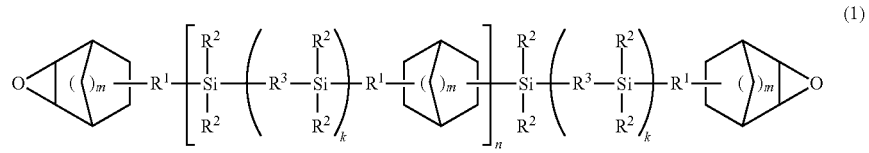

wherein $R^1$ represents an alkylene group having 2 to 6 carbon atoms and optionally containing an ester or ether bond; $R^2$ represents a monovalent aliphatic hydrocarbon group having 1 to 6 carbon atoms or a monovalent aromatic hydrocarbon group having 6 to 12 carbon atoms; $R^3$ represents an oxygen atom or a phenylene group; k represents 1 to 10 as an average value; m represents an integer of 0 to 2; n represents 0 to 10 as an average value; and a plurality of groups $R^1$, $R^2$, $R^3$, k, or m present in the formula may be the same or different from each other.

(2) The silicone-modified epoxy resin according to (1), wherein the silicone-modified epoxy resin is a reaction product of compounds represented by the following formulas (2) and (6):

wherein m is as defined above; and $R^4$ represents an alkylene group having 0 to 4 carbon atoms and optionally containing an ester or ether bond, and

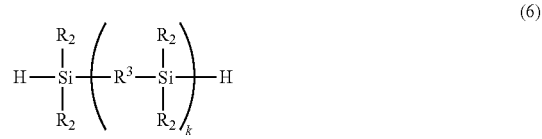

wherein $R^2$, $R^3$, and k are each as defined above.

(3) The silicone-modified epoxy resin according to (1), wherein the silicone-modified epoxy resin is obtained by reacting compounds represented by the following formulas (2), (6), and (8):

wherein m is as defined above; and $R^4$ represents an alkylene group having 0 to 4 carbon atoms and optionally containing an ester or ether bond,

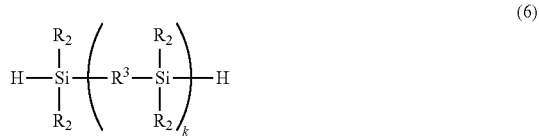

(6)

wherein $R^2$, $R^3$, and k are each as defined above, and

(8)

wherein m and $R^4$ are each as defined above.
(4) The silicone-modified epoxy resin according to (1), wherein the silicone-modified epoxy resin is obtained by oxidizing a diolefin compound of the following formula (4):

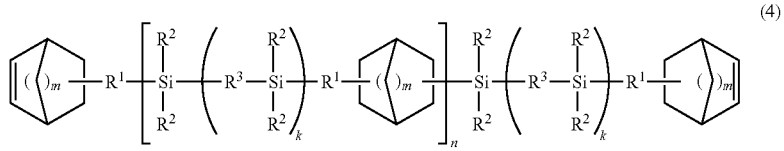

(4)

wherein $R^1$ to $R^3$, k, m, and n are each as defined above.
(5) An epoxy resin composition comprising (A) a silicone-modified epoxy resin according to any one of (1) to (4) and (B) an epoxy resin curing agent.
(6) The epoxy resin composition according to (5), further comprising (C) an epoxy resin curing catalyst.
(7) The epoxy resin composition according to (5), wherein the epoxy resin curing agent is selected from an amine curing agent, a phenol curing agent, an acid anhydride curing agent, and a polyvalent carboxylic acid resin.
(8) A cured article obtained by curing an epoxy resin composition according to any one of (5) to (7).

BRIEF DESCRIPTION OF DRAWINGS

FIG. 1 shows a 1H-NMR spectrum of the silicone-modified epoxy resin (A-1) obtained in Example 1.
FIG. 2 shows a GPC chart of the silicone-modified epoxy resin (A-1) obtained in Example 1.

DESCRIPTION OF EMBODIMENTS

The present silicone-modified epoxy resin may be prepared by oxidizing a diolefin resin, which is a precursor of the present silicone-modified epoxy resin. Methods for the oxidation may include, but not limited to, an oxidation method using a peracid such as peracetic acid, an oxidation method using hydrogen peroxide water, and an oxidation method using air (oxygen).

Specific methods for the epoxidation by oxidation using a peracid may include, but not limited to, methods described in Japanese Patent Laid-Open No. 2006-52187. Examples of the peracid that may be used may include, but not limited to, organic acids such as formic acid, acetic acid, propionic acid, maleic acid, benzoic acid, m-chlorobenzoic acid, and phthalic acid, and acid anhydrides thereof. Among them, formic acid, acetic acid, or phthalic anhydride is preferably used from the viewpoints of the efficiency of producing an organic peracid through reaction with hydrogen peroxide, reaction temperature, operational convenience, economy, etc. Particularly, formic acid or acetic acid is more preferably used from the viewpoint of the convenience of reaction operation.

Various approaches may be applied to the method for the epoxidation using hydrogen peroxide water. Specifically, methods described in Japanese Patent Laid-Open No. 59-108793, Japanese Patent Laid-Open No. 62-234550, Japanese Patent Laid-Open No. 5-213919, Japanese Patent Laid-Open No. 11-349579, Japanese Patent Publication No. 1-33471, Japanese Patent Laid-Open No. 2001-17864, Japanese Patent Publication No. 3-57102, etc., may be used.

Alternatively, methods described in Non Patent Literature 1 (James V. Crivello and Ramesh Narayan, Novel Epoxynorbornane Monomers. 1. Synthesis and Characterization, Macromolecules, 1996, Vol. 29, p. 433-438) may also be used. Specifically, the epoxy resin may be obtained by the epoxidation of an olefin group using Oxone.

Particularly preferred methods for obtaining the present epoxy resin will be described hereinafter as examples.
(A) Silicone-Modified Epoxy Resin First, the diolefin compound, which is a precursor of the present silicone-modified epoxy resin, is reacted with a polyacid and a quaternary ammonium salt in two layers of an organic solvent and hydrogen peroxide water.

The polyacid used in the present invention is not particularly limited as long as the polyacid is a compound having a polyacid structure. The polyacid is preferably a polyacid containing tungsten or molybdenum, more preferably a polyacid containing tungsten, particularly preferably a tungstate.

Examples of specific polyacids and polyacid salts included in the polyacid may include, but not limited to, tungsten-containing acids selected from tungstic acid, 12-tungstophosphoric acid, 12-tungstoboric acid, 18-tungstophosphoric acid, and 12-tungstosilicic acid, molybdenum-containing acids selected from molybdic acid and phosphomolybdic acid, and salts thereof.

Examples of counter cations of these salts may include, but not limited to, ammonium ions, alkaline earth metal ions, and alkali metal ions.

Specific examples thereof may include, but not limited to, alkaline earth metal ions such as calcium ions and magnesium ions, and alkali metal ions such as sodium, potassium, and cesium. Particularly preferred counter cations are sodium ions, potassium ions, calcium ions, or ammonium ions.

The amount of the polyacid used is 1.0 to 20 mmol, preferably 2.0 to 20 mmol, more preferably 2.5 to 10 mmol, in terms of metal elements (the number of moles of tungsten atoms for tungstic acid or molybdenum atoms for molybdic acid) with respect to 1 mol of olefin (functional group equivalent) in the present diolefin compound.

A quaternary ammonium salt having a total of 10 or more, preferably 25 to 100, more preferably 25 to 55 carbon atoms may be preferably used as the quaternary ammonium salt. Particularly, a quaternary ammonium salt having aliphatic chains as all of its alkyl chains is preferred.

Specific examples thereof may include, but not limited to, tridecanylmethyl ammonium salt, dilauryldimethyl ammonium salt, trioctylmethyl ammonium salt, trialkylmethyl (mixed type of a compound having an octyl group as an alkyl group and a compound having a decanyl group as an alkyl group) ammonium salt, trihexadecylmethyl ammonium salt, trimethylstearyl ammonium salt, tetrapentyl ammonium salt, cetyltrimethyl ammonium salt, benzyltributyl ammonium salt, dicetyldimethyl ammonium salt, tricetylmethyl ammonium salt, and di-hydrogenated tallow alkyldimethyl ammonium salt.

Also, carboxylic acid ions are used as anion species of these salts. The carboxylic acid ions are preferably acetic acid ions, carbonic acid ions, or formic acid ions. Particularly, acetic acid ions are preferred.

A quaternary ammonium salt having more than 100 carbon atoms may have poor solubility in an organic layer due to too strong hydrophobicity. On the other hand, a quaternary ammonium salt having less than 10 carbon atoms may similarly have poor compatibility with an organic layer due to too strong hydrophilicity.

The quaternary ammonium salt generally has residual halogen. In the present invention, particularly, 1% by mass or less, more preferably 1000 ppm or less, further preferably 700 ppm or less of halogen remains therein. A total amount of halogen exceeding 1% by mass is not preferred because a large amount of halogen may remain in a product.

As for the amounts of the tungstic acid or the like and the quaternary ammonium carboxylate used, the quaternary ammonium carboxylate is preferably used at an equivalent of 0.01 to 0.8 times or 1.1 to 10 times the valence of the tungstic acid or the like used. The quaternary ammonium carboxylate is more preferably used at an equivalent of 0.05 to 0.7 times or 1.2 to 6.0 times, further preferably 0.05 to 0.5 times or 1.3 to 4.5 times the valence of the tungstic acid or the like.

Since tungstic acid, $H_2WO_4$, for example, is divalent, the amount of the quaternary ammonium carboxylate used is preferably in the range of 0.02 to 1.6 mol or 2.2 to 20 mol with respect to 1 mol of the tungstic acid. Similarly, since tungstophosphoric acid is trivalent, the amount of the quaternary ammonium carboxylate is preferably 0.03 to 2.4 mol or 3.3 to 30 mol. Since silicotungstic acid is tetravalent, the amount of the quaternary ammonium carboxylate is preferably 0.04 to 3.2 mol or 4.4 to 40 mol.

If the amount of the quaternary ammonium carboxylate is lower than an equivalent of 1.1 times the valence of the tungstic acid or the like, the epoxidation reaction may be hindered from proceeding (in some cases, the reaction is accelerated) and tends to generate undesired by-products. An amount thereof larger than an equivalent of 10 times the valence of the tungstic acid or the like is not preferred because the excessive quaternary ammonium carboxylate not only requires laborious treatment but works to suppress the reaction.

Commercially available products may be used as the quaternary ammonium salt whose anion species is carboxylic acid ions. Alternatively, this quaternary ammonium salt may be produced by a method comprising, for example, converting a starting quaternary ammonium salt to quaternary ammonium hydroxide by treatment with metal hydroxide or an ion-exchange resin and further reacting the quaternary ammonium hydroxide with any of various carboxylic acids. Examples of the starting quaternary ammonium salt may include, but not limited to, halides or various metal salts of quaternary ammonium. Alternatively, suitable quaternary ammonium hydroxide, if available, may be used.

Any buffer solution may be used, but an aqueous phosphate solution is preferably used in this reaction. Its pH is preferably adjusted to pH 4 to 10 and is more preferably pH 5 to 9. A buffer solution having a pH lower than 4 tends to facilitate the hydrolysis reaction and polymerization reaction of the epoxy group. A buffer solution having a pH exceeding 10 may exceedingly slow down the reaction, disadvantageously resulting in too long reaction time.

In the present invention, it is particularly preferred that the pH should be adjusted to 5 to 9 when the catalyst tungstic acid or the like is dissolved in the buffer solution.

Examples of how to use the buffer solution may include, but not limited to, a method comprising, in the case of an aqueous phosphoric acid-phosphate solution, which is a preferred buffer solution, using phosphoric acid (or phosphate such as sodium dihydrogen phosphate) at an equivalent of 0.1 to 10% by mol with respect to hydrogen peroxide and adjusting the pH with a basic compound (e.g., sodium hydroxide, potassium hydroxide, sodium carbonate, sodium bicarbonate, and potassium carbonate). In this context, it is preferred that the pH should be adjusted to the pH mentioned above when hydrogen peroxide is added. Alternatively, the pH may be adjusted using sodium dihydrogen phosphate, disodium hydrogen phosphate, or the like. The concentration of the phosphate is preferably 0.1 to 60% by mass, more preferably 5 to 45% by mass.

In this reaction, phosphate such as disodium hydrogen phosphate, sodium dihydrogen phosphate, sodium phosphate, or sodium tripolyphosphate (or a hydrate thereof) may be added directly to the reaction system without the use of the buffer solution and without the pH adjustment. In terms of a simplified process, such direct addition is particularly preferred because the inconvenience of pH adjustment is eliminated. In this case, the amount of the phosphate used is an equivalent of usually 0.1 to 5% by mol, preferably 0.2 to 4% by mol, more preferably 0.3 to 3% by mol, with respect to hydrogen peroxide. If the amount of the phosphate used exceeds an equivalent of 5% by mol with respect to hydrogen peroxide, pH adjustment may be necessary. A phosphate used in an amount less than an equivalent of 0.1% by mol may have adverse effects in such a way that the phosphate facilitates the hydrolysis of the formed epoxy resin or slows down the reaction.

In this reaction, the epoxidation occurs by oxidation using hydrogen peroxide. The hydrogen peroxide is preferably used in this reaction as an aqueous solution having a hydrogen peroxide concentration of 10 to 40% by mass from the viewpoint of convenient handling thereof. A concentration exceeding 40% by mass is not preferred because hydrogen peroxide at this concentration is difficult to handle and also tends to facilitate the decomposition reaction of the formed silicone-modified epoxy resin.

This reaction employs an organic solvent. The amount of the organic solvent used is a mass ratio of 0.3 to 10, preferably 0.3 to 5, more preferably 0.5 to 2.5, to 1 of the diolefin compound serving as a reaction substrate. A mass ratio exceeding 10 is not preferred because the reaction proceeds exceedingly slowly. Specific examples of the organic solvent that may be used may include, but not limited to, alkanes such as hexane, cyclohexane, and heptane, aromatic hydrocarbon compounds such as toluene and xylene, and alcohols such as methanol, ethanol, isopropanol, butanol, hexanol, and cyclohexanol. In some cases, an organic solvent selected from, for example, ketones such as methyl ethyl ketone, methyl isobutyl ketone, cyclopentanone, and anone, ethers such as diethyl ether, tetrahydrofuran, and dioxane, ester compounds such as ethyl acetate, butyl acetate, and methyl formate, and nitrile compounds such as acetonitrile may be used.

Specific reaction operation methods, for example when carried out in a batch reactor, may comprise adding a diolefin compound, hydrogen peroxide (aqueous solution), a polyacid (catalyst), a buffer solution, a quaternary ammonium salt, and an organic solvent to the reactor, followed by stirring in two layers. The stirring speed is not particularly limited. Since hydrogen peroxide often generates heat when added, methods comprising gradually adding hydrogen peroxide after addition of each component are also possible.

The reaction temperature is not particularly limited but is preferably 0 to 90° C., more preferably 0 to 75° C., particularly preferably 15° C. to 60° C. Too high a reaction temperature tends to facilitate the hydrolysis reaction. At a low reaction temperature, the reaction rate is exceedingly slow.

The reaction time may vary depending on the reaction temperature, the amount of the catalyst, etc. From the viewpoint of industrial production, long-time reaction is not preferred because enormous energy is consumed. The range of the reaction time is preferably 1 to 48 hours, more preferably 3 to 36 hours, further preferably 4 to 24 hours.

After the completion of the reaction, excessive hydrogen peroxide is quenched. The quenching treatment is preferably carried out using a basic compound. Also, a reducing agent and the basic compound are preferably used in combination. Examples of preferred methods for the treatment may include, but not limited to, a method which comprises adjusting the pH to 6 to 12 by neutralization with the basic compound and then quenching the remaining hydrogen peroxide using the reducing agent. At pH lower than 6, excessive hydrogen peroxide might generate a large quantity of heat when reduced, resulting in decomposition products.

Examples of the reducing agent may include, but not limited to, sodium sulfite, sodium thiosulfate, hydrazine, oxalic acid, and vitamin C. The amount of the reducing agent used is usually 0.01- to 20-fold mol, more preferably 0.05- to 10-fold mol, further preferably 0.05- to 3-fold mol, with respect to the number of moles of the excessive hydrogen peroxide.

Examples of the basic compound may include, but not limited to, metal hydroxides such as sodium hydroxide, potassium hydroxide, magnesium hydroxide, and calcium hydroxide, metal carbonates such as sodium carbonate and potassium carbonate, phosphates such as sodium phosphate and sodium hydrogen phosphate, and basic solids such as ion-exchange resins and alumina.

When the basic compound is soluble in water or an organic solvent (various solvents including, e.g., aromatic hydrocarbons such as toluene and xylene, ketones such as methyl isobutyl ketone and methyl ethyl ketone, hydrocarbons such as cyclohexane, heptane, and octane, and alcohols such as methanol, ethanol, and isopropyl alcohol), the amount of the basic compound used is usually 0.01- to 20-fold mol, more preferably 0.05- to 10-fold mol, further preferably 0.05- to 3-fold mol, with respect to the number of moles of the excessive hydrogen peroxide. The basic compound may be added as a solution in water or the organic solvent mentioned above or may be added alone.

In the case of using a solid base that is insoluble in water or an organic solvent, the solid base is preferably used in an amount of 1 to 1000 times (mass ratio) the amount of the hydrogen peroxide remaining in the system. The amount of the solid base is more preferably 10 to 500 times, further preferably 10 to 300 times the amount thereof. In the case of using a solid base that is insoluble in water or an organic solvent, the treatment may be carried out after separation between an aqueous layer and an organic layer described later.

After the quenching (or before the quenching) of hydrogen peroxide, an operation is carried out by the addition of the organic solvent mentioned above to extract the reaction product from the aqueous layer, if the organic layer is not separated from the aqueous layer or the organic solvent is not used. In this operation, the organic solvent is used in an amount of 0.5 to 10 times, preferably 0.5 to 5 times (mass ratio) the amount of the starting material diolefin compound. This operation is repeated several times as needed, and then, the organic layer is separated and washed, if necessary, with water for purification.

The obtained organic layer is applied, if necessary, to an ion-exchange resin, metal oxide (particularly, silica gel, alumina, or the like is preferred), active carbon (particularly, chemically activated carbon is preferred), a complex metal salt (particularly, a basic complex metal salt is preferred), a clay mineral (particularly, a layered clay mineral such as montmorillonite is preferred), or the like for the removal of impurities and further subjected to washing with water and filtration, etc. Then, the solvent is distilled off to obtain the epoxy compound of interest. In some cases, the epoxy compound may be further purified by column chromatography or distillation.

The diolefin compound, which is a precursor of the present silicone-modified epoxy resin (A), is represented by the general formula (4):

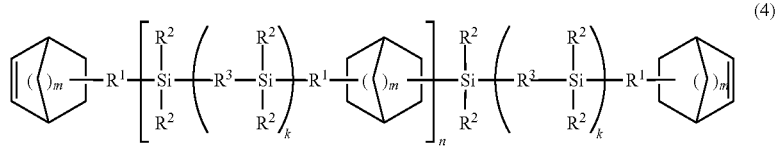

(4)

wherein $R^1$ represents an alkyl group having 0 to 6 carbon atoms and optionally containing an ester or ether bond; $R^2$ represents an alkyl group having 1 to 6 carbon atoms or an aromatic group; $R^3$ represents an oxygen atom or a phenylene group; k represents 1 to 10 as an average value; m represents an integer of 0 to 2; n represents 0 to 10 as an average value; and a plurality of groups $R^1$, $R^2$, $R^3$, k, or m present in the formula may be the same or different from each other.

$R^1$ is an alkylene group having 2 to 6 carbon atoms and optionally containing an ester or ether bond. Specific examples thereof may include, but not limited to an ethylene group, a propylene group, an isopropylene group, a butylene group, an isobutylene group, a pentylene group, a hexyl group, an ethylene ester group, a propylene ester group, a butylene ester group, a pentylene ester group, a isopropylene ester group, an isobutylene ester group, an ethylene ether group, a propylene ether group, a butylene ether group, a pentylene ether group, and a hexylene ether group. Among these alkylene groups, an ethylene group or a propylene group is particularly preferred from the viewpoint of the low gas permeability and strength of a cured article.

$R^2$ is a monovalent aliphatic hydrocarbon group having 1 to 6 carbon atoms or a monovalent aromatic hydrocarbon group having 6 to 12 carbon atoms. Specific examples of the monovalent aliphatic hydrocarbon group having 1 to 12 carbon atoms may include, but not limited to: saturated monovalent aliphatic hydrocarbon groups including alkyl groups such as a methyl group, an ethyl group, a n-propyl group, an isopropyl group, a n-butyl group, a t-butyl group, a heptyl group, a 2-ethylhexyl group, a heptyl group, and an octyl group; unsaturated monovalent aliphatic hydrocarbon groups including alkenyl groups such as a vinyl group, an allyl group, an isopropenyl group, and a butenyl group. The monovalent aliphatic hydrocarbon group is preferably a methyl group, an ethyl group, a n-propyl group, an isopropyl group, a n-butyl group, a t-butyl group, or a heptyl group, more preferably a methyl group. Specific examples of the monovalent aromatic hydrocarbon group having 6 to 12 carbon atoms may include, but not limited to: aryl groups such as a phenyl group, a tolyl group, a xylyl group, and a naphthyl group; and aralkyl groups such as a benzyl group, a 2-phenylethyl group, and a 2-phenylpropyl group. The monovalent aromatic hydrocarbon group is preferably a phenyl group, a benzyl group, a 2-phenylethyl group, or a 2-phenylpropyl group, more preferably a phenyl group.

$R^3$ is an oxygen atom or a phenylene group. Among them, a phenylene group is preferred from the viewpoint of low gas permeability.

m is an integer of 0 to 2 and is preferably 1 or 2. n is 0 to 10 as an average value and is preferably 0 to 5, more preferably 0 to 2. k is 1 to 10 as an average value and is preferably 1 to 2 from the viewpoint of the low gas permeability of a cured article.

Specific examples of the silicone-modified epoxy resin as the component (A) may include, but not limited to, an epoxidation product of a diolefin compound represented by the following formula (5) (in the following formula, Me represents a methyl group):

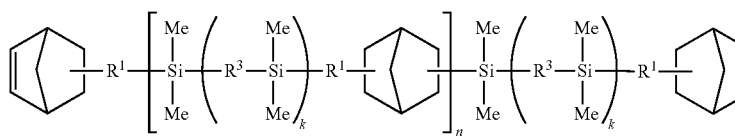
(5)

wherein $R^1$, $R^3$, k, and n are each as defined above.

The diolefin form may be produced, for example, through the hydrosilylation reaction of one or more organosilicon compound(s) having a terminal SiH group in the molecule represented by the following general formula (6):

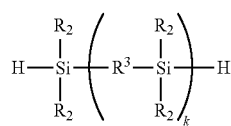
(6)

wherein $R^2$, $R^3$, and k are each as defined above, with a compound having a terminal alkenyl group represented by the following general formula (8):

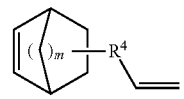
(8)

wherein $R^4$ represents an alkylene group having 0 to 4 carbon atoms and optionally containing an ester or ether bond, in the presence of a platinum catalyst.

Specific examples of the compound having a terminal alkenyl group may include, but not limited to, compounds represented by the following formulas (9) to (11):

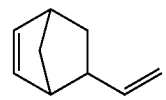
(9)

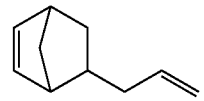
(10)

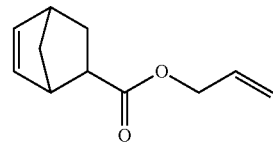
(11)

In this way, the diolefin form represented by the formula (4) may be obtained.

Then, the obtained diolefin form may be oxidized by the diolefin resin oxidation method as mentioned above to obtain the present silicone-modified epoxy resin.

In another approach, the present silicone-modified epoxy resin is also obtained through the hydrosilylation reaction of an epoxy group-containing compound containing a terminal alkenyl group represented by the following formula (2):

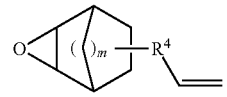
(2)

wherein $R^4$ and m are each as defined above, with one or more organosilicon compound(s) having a terminal SiH group in the molecule as described above.

R⁴ is an alkylene group having 0 to 4 carbon atoms and optionally containing an ester or ether bond and is specifically a methylene group, an ethylene group, a propylene group, a butylene group, an isopropylene group, a methyl ester group, a methyl ether group, or the like.

Examples of the compound represented by the formula (2) may include, but not limited to, an epoxy group-containing compound containing a terminal alkenyl group represented by the following formulas (12) to (14):

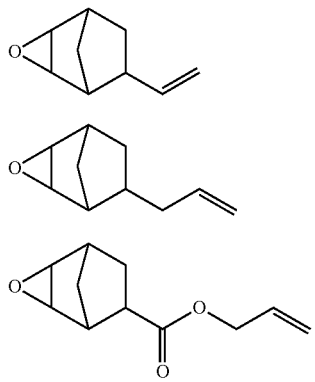

In this context, the organosilicon compound having a terminal SiH group may be obtained through the reaction of the compound of the formula (6) with the compound of the formula (8). In this context, the compound of the formula (6) may be used directly. Examples of such compounds may include, but not limited to, a compound represented by the following formula (3):

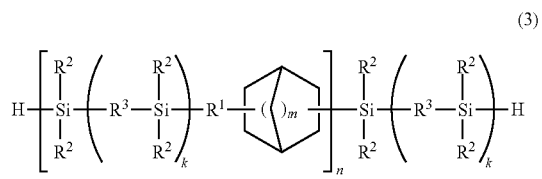

wherein $R^2$, $R^3$, k, m, and n are each as defined above.

In this case, the reaction ratio between the organosilicon compound having a terminal SiH group and the compound having a terminal alkenyl group is preferably a SiH group/alkenyl group molar ratio (H/Vi) of 0.1 to 3.0, particularly preferably 0.5 to 1.5. The hydrosilylation reaction may be carried out according to methods conventionally known in the art.

The present epoxy resin may be obtained by reacting the compound represented by the formula (2) as the epoxy group-containing compound containing a terminal alkenyl group, as described above, with an intermediate obtained through the reaction of the compound represented by the formula (6) with the compound represented by the formula (8), or the epoxy resin of interest may be obtained by reacting at once the compounds represented by the formulas (6), (8), and (2). Alternatively, the epoxy resin of interest may be obtained by reacting the compound represented by the formula (6) with the compound represented by the formula (2).

The epoxy group-containing compound containing a terminal alkenyl group may be obtained by oxidizing the compound having a terminal alkenyl group by the diolefin resin oxidation method as mentioned above.

(B) Curing Agent

A curing agent having one or more functional groups reactive with an epoxy group is used as the curing agent. Examples thereof may include, but not limited to, amine curing agents, phenol curing agents, acid anhydride curing agents, and polyvalent carboxylic acid resins. Among them, an acid anhydride curing agent or a polyvalent carboxylic acid resin is preferred. Examples of the acid anhydride curing agent may include, but not limited to, phthalic anhydride, maleic anhydride, trimellitic anhydride, pyromellitic anhydride, hexahydrophthalic anhydride, 3-methyl-hexahydrophthalic anhydride, 4-methyl-hexahydrophthalic anhydride, mixtures of 3-methyl-hexahydrophthalic anhydride and 4-methyl-hexahydrophthalic anhydride, tetrahydrophthalic anhydride, nadic anhydride, methylnadic anhydride, norbornane-2,3-dicarboxylic anhydride, methyl norbornane-2,3-dicarboxylic anhydride, and 2,4-diethylglutaric anhydride. Among them, hexahydrophthalic anhydride or a derivative thereof is preferred.

Next, the polyvalent carboxylic acid resin will be described.

The polyvalent carboxylic acid resin (B) is a compound that has at least two or more carboxyl groups and has an aliphatic hydrocarbon group or a siloxane skeleton as a backbone. In the present invention, the polyvalent carboxylic acid resin not only means a polyvalent carboxylic acid compound having a single structure but also includes a mixture of a plurality of compounds differing in substituent position or differing in substituent, i.e., a polyvalent carboxylic acid composition. In the present invention, such a compound and a composition are collectively referred to as the polyvalent carboxylic acid resin.

The polyvalent carboxylic acid resin (B) is particularly preferably a di- to hexafunctional carboxylic acid, more preferably a compound obtained through the reaction of a di- to hexafunctional polyhydric alcohol having 5 or more carbon atoms or a polyhydric alcohol having a siloxane structure with an acid anhydride, further preferably polycarboxylic acid obtained using a saturated aliphatic cyclic acid anhydride as the acid anhydride.

The di- to hexafunctional polyhydric alcohol is not particularly limited as long as the alcohol is a compound having an alcoholic hydroxy group. Examples thereof may include, but are not limited to: diols such as ethylene glycol, propylene glycol, 1,3-propanediol, 1,2-butanediol, 1,4-butanediol, 1,5-pentanediol, 1,6-hexanediol, cyclohexanedimethanol, 2,4-diethylpentanediol, 2-ethyl-2-butyl-1,3-propanediol, neopentyl glycol, tricyclodecanedimethanol, and norbornenediol; triols such as glycerin, trimethylolethane, trimethylolpropane, trimethylolbutane, and 2-hydroxymethyl-1,4-butanediol; tetraols such as pentaerythritol and ditrimethylolpropane; and hexols such as dipentaerythritol.

The alcohol is particularly preferably an alcohol having 5 or more carbon atoms. Examples thereof may particularly include, but not limited to, compounds such as 1,6-hexanediol, 1,4-cyclohexanedimethanol, 1,3-cyclohexanedimethanol, 1,2-cyclohexanedimethanol, 2,4-diethylpentanediol, 2-ethyl-2-butyl-1,3-propanediol, neopentyl glycol, tricyclodecanedimethanol, and norbornenediol. Among them, an alcohol having a branched structure or a cyclic structure, such as 2-ethyl-2-butyl-1,3-propanediol, neopentyl glycol, 2,4-diethylpentanediol, 1,4-cyclohexanedimethanol, tricyclodecanedimethanol, or norbornenediol, is more preferred.

2,4-Diethylpentanediol or tricyclodecanedimethanol is particularly preferred from the viewpoint of conferring a high rate of illuminance retention.

The polyhydric alcohol having a siloxane structure is not particularly limited, and, for example, a silicone oil represented by the following formula may be used:

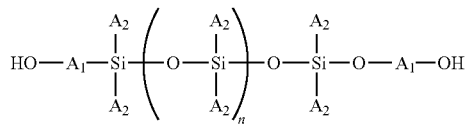

wherein $A_1$ represents an alkylene group having a total of 1 to 10 carbon atoms optionally via an ether bond; $A_2$ represents a methyl group or a phenyl group; and n represents the number of repeats as an average value and is 1 to 100.

The acid anhydride is particularly preferably methyltetrahydrophthalic anhydride, methylnadic anhydride, nadic anhydride, hexahydrophthalic anhydride, methylhexahydrophthalic anhydride, butanetetracarboxylic anhydride, bicyclo[2,2,1]heptane-2,3-dicarboxylic anhydride, methylbicyclo[2,2,1]heptane-2,3-dicarboxylic anhydride, or cyclohexane-1,3,4-tricarboxylic acid-3,4-anhydride, particularly preferably methylhexahydrophthalic anhydride or cyclohexane-1,3,4-tricarboxylic acid-3,4-anhydride. In this context, cyclohexane-1,3,4-tricarboxylic acid-3,4-anhydride is preferred for enhancing hardness, and methylhexahydrophthalic anhydride is preferred for enhancing the rate of illuminance retention.

Addition reaction conditions are not particularly limited, and one of the specific reaction conditions is that comprising reacting and heating the acid anhydride with the polyhydric alcohol at 40 to 150° C. under the condition of no catalyst or solvent, and directly isolating the reaction product after the completion of the reaction. However, the reaction conditions are not limited thereto.

The polycarboxylic acid thus obtained is particularly preferably a compound represented by the following formula:

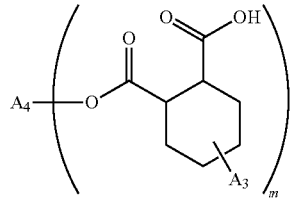

wherein a plurality of groups $A_3$ present each represent at least one of a hydrogen atom, a methyl group, or a carboxyl group; $A_4$ represents a linear or cyclic aliphatic group having 2 to 20 carbon atoms derived from the polyhydric alcohol as mentioned above; and m represents 2 to 4.

The present resin composition preferably contains an acid anhydride. Specific examples of the acid anhydride may include, but not limited to, acid anhydrides such as phthalic anhydride, trimellitic anhydride, pyromellitic anhydride, maleic anhydride, tetrahydrophthalic anhydride, methyltetrahydrophthalic anhydride, methylnadic anhydride, nadic anhydride, hexahydrophthalic anhydride, methylhexahydrophthalic anhydride, butanetetracarboxylic anhydride, bicyclo[2,2,1]heptane-2,3-dicarboxylic anhydride, methylbicyclo[2,2,1]heptane-2,3-dicarboxylic anhydride, and cyclohexane-1,3,4-tricarboxylic acid-3,4-anhydride.

The acid anhydride is particularly preferably methyltetrahydrophthalic anhydride, methylnadic anhydride, nadic anhydride, hexahydrophthalic anhydride, methylhexahydrophthalic anhydride, butanetetracarboxylic anhydride, bicyclo[2,2,1]heptane-2,3-dicarboxylic anhydride, methylbicyclo[2,2,1]heptane-2,3-dicarboxylic anhydride, cyclohexane-1,3,4-tricarboxylic acid-3,4-anhydride, or the like.

The acid anhydride is particularly preferably hexahydrophthalic anhydride, methylhexahydrophthalic anhydride, or cyclohexane-1,3,4-tricarboxylic acid-3,4-anhydride represented by the following formula:

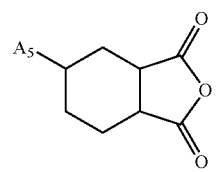

wherein $A_5$ represents at least one or more of a hydrogen atom, a methyl group, or a carboxyl group.

Among them, methylhexahydrophthalic anhydride or cyclohexane-1,3,4-tricarboxylic acid-3,4-anhydride is preferred.

The polyvalent carboxylic acid resin (B) and the acid anhydride are preferably used in combination. In the case of combined use, the ratio between the polyvalent carboxylic acid resin (B) and the acid anhydride used preferably falls within the following range:

$$W1/(W1+W2)=0.05 \sim 0.70$$

W1 represents the amount (parts by mass) of the polyvalent carboxylic acid resin (B) mixed, and W2 represents the amount (parts by mass) of the acid anhydride mixed. The range of $W1/(W1+W2)$ is more preferably 0.05 to 0.60, further preferably 0.10 to 0.55, particularly preferably 0.15 to 0.4. A range that falls below 0.05 is not preferred because there is a strong tendency to increase the volatilization of the acid anhydride during curing. If this range exceeds 0.70, handling becomes difficult due to high viscosity. When the resin composition contains no acid anhydride (except that a small amount of the acid anhydride remains), its form is solid or nearly solid or is crystalline, and thus causes no problem.

In the case of using the polyvalent carboxylic acid resin (B) and the acid anhydride in combination, producing the polyvalent carboxylic acid resin (B) in an excessive acid anhydride to form a mixture of the polyvalent carboxylic acid (B) and the acid anhydride is also preferred from the viewpoint of operational convenience.

The amount of the curing agent mixed as the component (B) is an amount of 0.3 to 1.0 mol, preferably 0.4 to 0.8 mol, in terms of the functional group reactive with an epoxy group (said functional group being an acid anhydride group represented by —CO—O—CO— when the curing agent is the acid anhydride curing agent) with respect to 1 mol in total of the epoxy group in the component (A). 0.3 mol or more of the functional group reactive with an epoxy group improves the heat resistance and transparency of a cured article and is therefore desirable. 1.0 mol or less of the functional group reactive with an epoxy group improves the mechanical properties of a cured article and is therefore preferred. In this context, the "functional group reactive with an epoxy group" is an amino group in the amine curing agent, a phenolic hydroxy group in the phenol curing agent, an acid anhydride group in the acid anhydride curing agent, or a carboxyl group in the polyvalent carboxylic acid resin.

(C) Curing Catalyst

Examples of the curing catalyst may include, but not limited to: quaternary phosphonium salts such as tetrabutylphosphonium O,O-diethyl phosphorodithioate and tetraphenylphosphonium tetraphenylborate; organic phosphine curing catalysts such as triphenylphosphine and diphenylphosphine; tertiary amine curing catalysts such as 1,8-diazabicyclo(5,4,0)undecene-7, triethanolamine, and benzyldimethylamine; quaternary ammonium salts such as 1,8-diazabicyclo(5,4,0)undecene-7 phenol salt, 1,8-diazabicyclo(5,4,0)undecene-7 octoate, 1,8-diazabicyclo(5,4,0)undecene-7 p-toluenesulfonate, and 1,8-diazabicyclo(5,4,0)undecene-7 formate; organic carboxylates such as zinc octoate and zinc naphthoate; aluminum chelating compounds such as aluminum bisethylacetoacetate-monoacetylacetonate and aluminum ethylacetoacetate-diisopropylate; and imidazoles such as 2-methylimidazole and 2-phenyl-4-methylimidazole. A quaternary phosphonium salt or a quaternary ammonium salt is desirable.

The amount of the curing catalyst (C) mixed is 0.01 to 3 parts by mass, preferably 0.05 to 1.5 parts by mass, with respect to 100 parts by mass in total of the component (A) and the component (B). The curing catalyst mixed in an amount lower than the lower limit might be insufficiently effective for accelerating the reaction between the epoxy resin and the curing agent. On the other hand, the curing catalyst mixed in an amount larger than the upper limit might be responsible for change in color during curing or during a reflow test.

(D) Antioxidant

The antioxidant includes a phosphorous acid compound, a hindered phenol antioxidant, and the like, and is preferably a hindered phenol antioxidant. Also, a hindered amine ultraviolet absorber is preferred as an ultraviolet absorber. The amount of the component (D) mixed is 0.1 to 0.5 parts by mass, preferably 0.1 to 0.3 parts by mass, with respect to 100 parts by mass of the component (A). The antioxidant mixed in an amount exceeding the upper limit is not preferred because the residual antioxidant is deposited on the surface of the resin after curing. The antioxidant mixed in an amount less than the lower limit reduces heat resistance and transparency.

Other Components

The components described above may be further used, if necessary, in combination with an additive routinely used, for example, an ultraviolet absorber, an antidegradant, a phosphor, a heat plasticizer, and/or a diluent.

The present resin composition for optical semiconductor device sealing may be produced by mixing the components described above and, if necessary, various additives and dissolving or melt-mixing these components. The melt mixing may be carried out by methods known in the art. For example, these components may be placed in a reactor and melt-mixed in a batch manner. Alternatively, these components may be placed in a kneading machine such as a kneader or a triple heat roll and continuously melt-mixed. The curing catalyst (C) is preferably dissolved by heating and mixed in advance into the curing agent (B), and at the final stage of mixing, this mixture is preferably dispersed and mixed with the component (A), the component (D), etc.

EXAMPLES

Hereinafter, the present invention will be described in more detail with reference to Synthesis Examples and Examples. The present invention is not intended to be limited by these Synthesis Examples and Examples. In Synthesis Examples and Examples, each physical property value was measured by methods given below. In this context, the term "part" means part by mass unless otherwise specified.

GPC: GPC measurements were conducted under the following conditions:
Various conditions for GPC
Manufacture: Waters Corp.
Column: SHODEX GPC LF-G (gourd column), KF-603, KF-602.5, KF-602, and KF-601 (two columns)
Flow rate: 0.4 ml/min.
Column temperature: 40° C.
Solvent used: THF (tetrahydrofuran)
Detector: RI (differential refractometer)
NMR: NMR measurements were conducted in a deuterated chloroform solvent using JNM-ECS400 manufactured by JEOL Ltd.
Epoxy equivalent: epoxy equivalents were measured by the method described in JIS K7236.

Synthesis Example 1: Synthesis of Diolefin Compound 1

To a 1 L separable flask, 5-vinyl-2-norbornene (1.3 mol, 156 g), 200 g of toluene, and 0.20 g of a solution containing 0.5% by mass of chloroplatinic acid in toluene were added, and the internal temperature was raised to 80° C. Next, a mixed solution of 1,4-bis(dimethylsilyl)benzene (1 mol, 194 g) was added dropwise thereto over 1 hour. After the completion of the dropwise addition, the mixture was reacted at 110° C. for 4 hours. The obtained toluene solution was distilled under reduced pressure to obtain diolefin compound 1 composed mainly of a compound (15) shown below. The obtained diolefin compound 1 was confirmed by 1H-NMR to have an olefin equivalent of 0.319 mol/100 g.

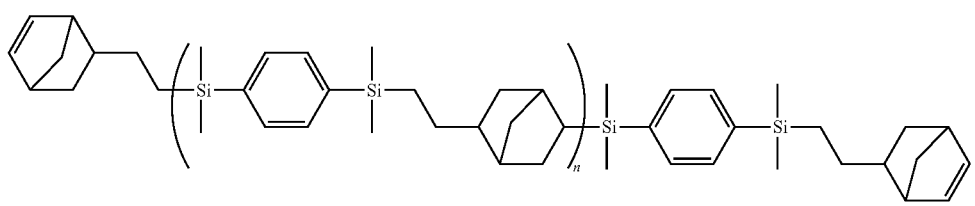

(15)

wherein n=0.93 from the area ratio of GPC.

Example 1: Synthesis of Silicone-Modified Epoxy Resin

To a flask equipped with a stirring apparatus and a reflux condenser, 157 parts of diolefin compound 1 (olefin equivalent: 0.319 mol/100 g) obtained in Synthesis Example 1, 150 parts of toluene, 5.4 parts of trioctylmethyl ammonium acetate (50 mass % solution in xylene, TOMAA-50 manufactured by LION AKZO Co., Ltd.), 9 parts of water, 2.6 parts of 12-tungstophosphoric acid, 0.9 parts of sodium tungstate, and 1.4 parts of sodium dihydrogen phosphate were added. While the mixture was heated to 50±3° C. with stirring, 63 parts of 35% by mass of hydrogen peroxide water were added thereto. The mixture was continuously stirred at 50±3° C. for 24 hours. The progression of the reaction was confirmed by 1H-NMR. As a result, the rate of conversion from olefin to epoxy after the completion of the reaction was >99%, and the peak of the starting material olefin disappeared (1% or less).

Subsequently, the pH was adjusted to 9 with an aqueous solution containing 30% by mass of sodium hydroxide. Then, 25 parts of an aqueous solution containing 20% by mass of sodium thiosulfate were added thereto, and the mixture was stirred for 30 minutes and left standing. The organic layer was isolated from separated two layers. 12.5 parts of active carbon (CP manufactured by Ajinomoto Fine-Techno Co., Inc.) were added thereto, and the mixture was stirred at room temperature for 4 hours and then filtered. The organic solvent in the obtained filtrate was distilled off to obtain 162 parts of a present silicone-modified epoxy resin (A-1) composed mainly of a compound of the following formula (16):

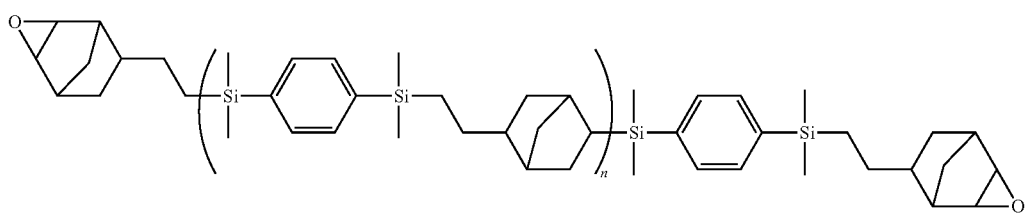

(16)

wherein n=0.93 from the area ratio of GPC.

From 1H-NMR measurement results, the silicone-modified epoxy resin (A-1) was confirmed to contain >98% of the compound having the skeleton of the formula (16). In GPC measurement, the purity was >99%. The epoxy equivalent was unable to be accurately measured by the method described in JIS K7236 (theoretical epoxy equivalent calculated from the olefin equivalent: 330 g/eq). The 1H-NMR spectrum and the GPC chart of the silicone-modified epoxy resin (A-1) are shown in FIGS. 1 and 2, respectively.

The epoxy resins used in Comparative Examples are as follows.

Comparative Example 1

3'-4'-Epoxycyclohexylmethyl 3,4-epoxycyclohexanecarboxylate (manufactured by Daicel Corp., CEL2021P)

Comparative Example 2: Synthesis of Organopolysiloxane Containing Alicyclic Epoxy Group In a reactor, MeO(Me)$_2$SiO(Me$_2$SiO)$_m$Si(Me)$_2$OMe (m represents an integer of 1 to 8 and is 1.5 on average) (1.0 mol, 306 g), β-(3,4-epoxycyclohexyl)ethyltrimethoxysilane (manufactured by Shin-Etsu Chemical Co., Ltd., KBM-303) (1.0 mol, 246 g), and 500 g of isopropyl alcohol were placed, then 12 g of an aqueous solution containing 25% by mass of tetramethyl ammonium hydroxide and 110 g of water were added, and the mixture was stirred at room temperature for 3 hours. Subsequently, 500 ml of toluene was added into the system, followed by neutralization with an aqueous sodium dihydrogen phosphate solution. The organic layer (toluene solution) separated using a separatory funnel was washed with hot water, and then, toluene was distilled off under reduced pressure to obtain a silicone-modified epoxy resin (A-3) having a structure represented by the average composition formula (20) given below. The silicone-modified epoxy resin (A-3) had a polystyrene-based weight-average molecular weight of 4300 measured by GPC and had an epoxy equivalent (measured by the titration method (JIS K7236); the same applies below) of 403 g/eq.

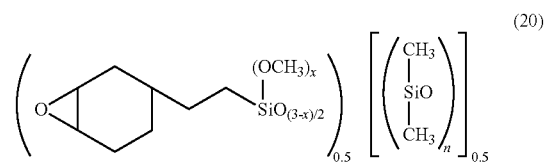

(20)

Synthesis Example 2: Synthesis of Mixture of Polyvalent Carboxylic Acid Resin and Acid Anhydride Compound Used as Curing Agent To a flask equipped with a stirrer, a reflux condenser, and a stirring apparatus, 15 parts of tricyclodecanedimethanol, 70 parts of methylhexahydrophthalic anhydride (manufactured by New Japan Chemical Co., Ltd., RIKACID MH), and 15 parts of cyclohexane-1,2,4-tricarboxylic acid-1,2-anhydride (manufactured by Mitsubishi Gas Chemical Co., Inc., H-TMAn) were added under purging with nitrogen, and the mixture was reacted at 40° C. for 3 hours and then heated at 70° C. for 1 hour with stirring. The peak of the tricyclodecanedimethanol was confirmed to be 1% by area or smaller by GPC, and 100 parts of a curing agent (B) as a mixture of the polyvalent carboxylic acid resin and the acid anhydride compound were obtained. The obtained mixture was a clear liquid resin, and its purity measured by GPC was 37% by area of the polyvalent carboxylic acid resin (represented by the formula P given below), 11% by area of the cyclohexane-1,2,4-tricarboxylic acid-1,2 anhydride, and 52% by area of the methylhexahydrophthalic anhydride. The functional group equivalent was 171 g/eq.

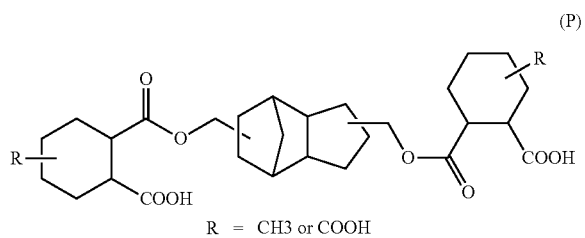

(P)

R = CH3 or COOH

Preparation of Composition

Each resin composition was prepared according to the formulation (parts by mass) shown in Table 1 below. As a result, epoxy resin compositions of Examples 2 and 3 and Comparative Examples 1 and 2 were obtained. Each component in the table is as described below. In the table, a blank field means "0".

(C) Curing catalyst: quaternary phosphonium salt (manufactured by San-Apro Ltd., U-CAT5003)
(D) Antioxidant: pentaerythritol tetrakis[3-(3',5'-di-t-butyl-4'-hydroxyphenyl)propionate] (manufactured by ADEKA Corp., ADK STAB AO-60)

Characteristic Evaluation of Composition and Cured Article

Each obtained composition and cured article was characteristically evaluated by methods described below. Curing was carried out by the heating of the composition at 100° C. for 1 hour and subsequently at 150° C. for 4 hours. The results are shown in Table 1.

(1) Viscosity

The viscosity was measured at 23° C. using a type E rotary viscometer manufactured by Toki Sangyo Co., Ltd.

(2) Hardness

The hardness of a rod-shaped cured article was measured according to JIS K6301 (type D).

(3) TMA (Tg, CTE)

A 5 mm×15 mm test specimen having a thickness of 4 mm was assayed using TMA/SS-6100 manufactured by SII NanoTechnology Inc.

(4) Moisture Vapor Transmission Rate

The moisture vapor transmission rate of each cured article having a thickness of 0.5 mm was measured according to JIS K 7129.

TABLE 1

| Formulation | | Example | | Comparative Example | |
|---|---|---|---|---|---|
| | | 2 | 3 | 1 | 2 |
| (A-1) Silicon-modified epoxy resin | Example 1 | 50 | 25 | | |
| (A-2) Epoxy resin | CEL2021P | 50 | 75 | 100 | |
| (A-3) Silicon-modified epoxy resin | Comparative Example 2 | | | | 100 |
| (B) Curing agent | Synthesis Example 2 | 73 | 89 | 104 | 33 |
| (C) Curing catalyst | U-CAT-5003 | 0.4 | 0.4 | 0.4 | 0.4 |
| (D) Antioxidant | ADK STAB AO-60 | 0.5 | 0.5 | 0.5 | 0.5 |
| Characteristic evaluation | | | | | |
| Viscosity (23° C.) | Pa · s | 6.4 | 3.8 | 0.8 | 3.2 |
| Tg | ° C. | 144 | 166 | 189 | 40 |
| CTE1 | ppm | 93 | 85 | 64 | 150 |
| CTE2 | ppm | 181 | 165 | 144 | 230 |
| Flexural strength | MPa | 62 | 77 | 100 | 30 |

TABLE 1-continued

| Formulation | | Example | | Comparative Example | |
|---|---|---|---|---|---|
| | | 2 | 3 | 1 | 2 |
| Flexural modulus | N/mm² | 1900 | 2500 | 2700 | 1300 |
| Moisture vapor transmission rate | g/m² · 24 h, 0.5 mm thick | 2.9 | 5 | 6.8 | 40 |
| Hardness (Shore D) | — | 87 | 88 | 82 | 65 |

As is evident from the results in Table 1, the compositions of Examples 2 and 3 are excellent in low gas permeability and strength. By contrast, the composition of Comparative Example 1 is excellent in strength but inferior in low gas permeability. Also, the silicone-modified epoxy resin of Comparative Example 2 is inferior in both low gas permeability and strength.

What is claimed is:

1. A silicone-modified epoxy resin represented by the following formula (1):

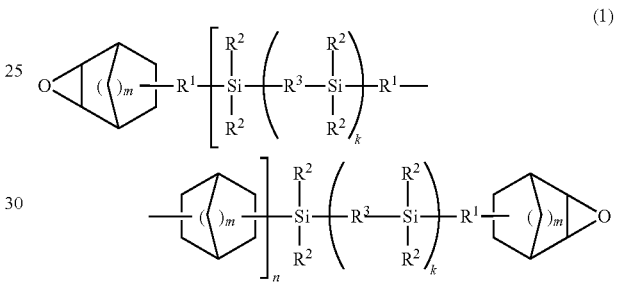

(1)

wherein $R^1$ represents an alkylene group having 2 to 6 carbon atoms and optionally containing an ester or ether bond; $R^2$ represents a monovalent aliphatic hydrocarbon group having 1 to 6 carbon atoms or a monovalent aromatic hydrocarbon group having 6 to 12 carbon atoms; $R^3$ represents an oxygen atom or a phenylene group; k represents 1 to 10 as an average value; m represents an integer of 0 to 2; n represents an average value between greater than 0 and 10; and a plurality of groups $R^1$, $R^2$, $R^3$, k, or m present in the formula may be the same or different from each other, and wherein the silicone-modified epoxy resin is obtained by reacting compounds represented by the following formulas (2), (6), and (8):

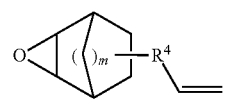

(2)

wherein m is as defined above; and $R^4$ represents an alkylene group having 0 to 4 carbon atoms and optionally containing an ester or ether bond,

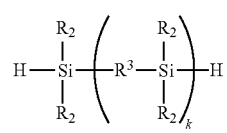

(6)

wherein $R^2$, $R^3$, and k are each as defined above, and

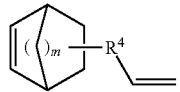
(8)

wherein m and $R^4$ are each as defined above.

2. An epoxy resin composition comprising (A) a silicone-modified epoxy resin according to claim 1 and (B) an epoxy resin curing agent.

3. The epoxy resin composition according to claim 2, further comprising (C) an epoxy resin curing catalyst.

4. The epoxy resin composition according to claim 2, wherein the epoxy resin curing agent is selected from an amine curing agent, a phenol curing agent, an acid anhydride curing agent, and a polyvalent carboxylic acid resin.

5. A cured article obtained by curing an epoxy resin composition according to claim 2.

* * * * *